(12) United States Patent
Luman et al.

(10) Patent No.: US 10,988,209 B1
(45) Date of Patent: Apr. 27, 2021

(54) BICYCLE CONTROL SYSTEM

(71) Applicant: SRAM, LLC, Chicago, IL (US)

(72) Inventors: Nathan Luman, Oak Park, IL (US); Christopher Shipman, Chicago, IL (US); Patrick Gruse, Colorado Springs, CO (US)

(73) Assignee: SRAM, LLC, Chicago, IL (US)

( * ) Notice: Subject to any disclaimer, the term of this patent is extended or adjusted under 35 U.S.C. 154(b) by 0 days.

(21) Appl. No.: 16/815,570

(22) Filed: Mar. 11, 2020

(51) Int. Cl.
| | |
|---|---|
| *B62M 25/08* | (2006.01) |
| *B62L 3/02* | (2006.01) |
| *B62K 23/06* | (2006.01) |

(52) U.S. Cl.
CPC ............ *B62M 25/08* (2013.01); *B62K 23/06* (2013.01); *B62L 3/023* (2013.01); *B60L 2200/12* (2013.01)

(58) Field of Classification Search
CPC B62M 25/04; B62M 25/08; B62M 2025/003; B62K 23/02; B62K 23/06; B62L 3/02; B62L 3/023; B60L 2200/12
See application file for complete search history.

(56) References Cited

U.S. PATENT DOCUMENTS

| | | | | |
|---|---|---|---|---|
| 7,703,350 B2* | 4/2010 | Fujii | ...................... | B62K 23/06 |
| | | | | 74/501.6 |
| 7,760,078 B2* | 7/2010 | Miki | ...................... | B62M 25/08 |
| | | | | 340/432 |
| 7,874,229 B2* | 1/2011 | Tetsuka | .................. | B62M 25/08 |
| | | | | 74/502.2 |
| 10,407,122 B2* | 9/2019 | Komada | ................... | B62L 3/02 |
| 10,414,463 B2* | 9/2019 | Komatsu | ............... | B62M 25/08 |
| 10,618,596 B2* | 4/2020 | Komada | ................ | B62K 23/06 |
| 2007/0193387 A1* | 8/2007 | Nakano | .................. | B62K 23/06 |
| | | | | 74/501.6 |
| 2010/0083786 A1* | 4/2010 | Miki | ...................... | B62K 21/26 |
| | | | | 74/489 |
| 2016/0195933 A1* | 7/2016 | Yang | ...................... | G06F 3/015 |
| | | | | 345/156 |
| 2020/0070929 A1* | 3/2020 | Mizutani | ................ | B62K 23/06 |

* cited by examiner

*Primary Examiner* — Adam D Rogers

(57) ABSTRACT

A bicycle control system includes a housing having an upper mounting surface and housing a brake actuation system. A lever is pivotally coupled to the housing about an axis and is operably coupled to the brake actuation system. An electronic module includes a housing releasably coupled to the upper mounting surface. The housing sealingly encloses at least one electronic component. The lever may be pivotally coupled to the housing about both a shift axis and a brake axis, wherein the shift axis and the brake axis being non-orthogonal. A bicycle control kit includes different first and second electronic modules.

19 Claims, 17 Drawing Sheets

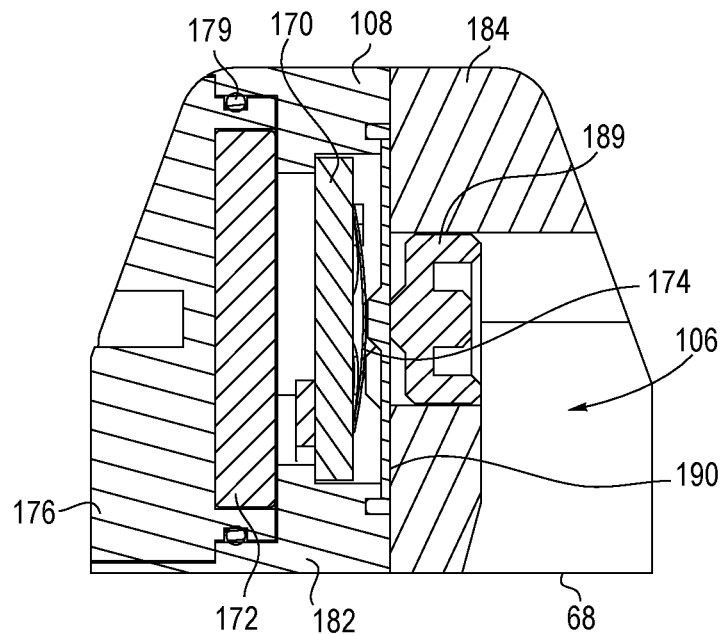
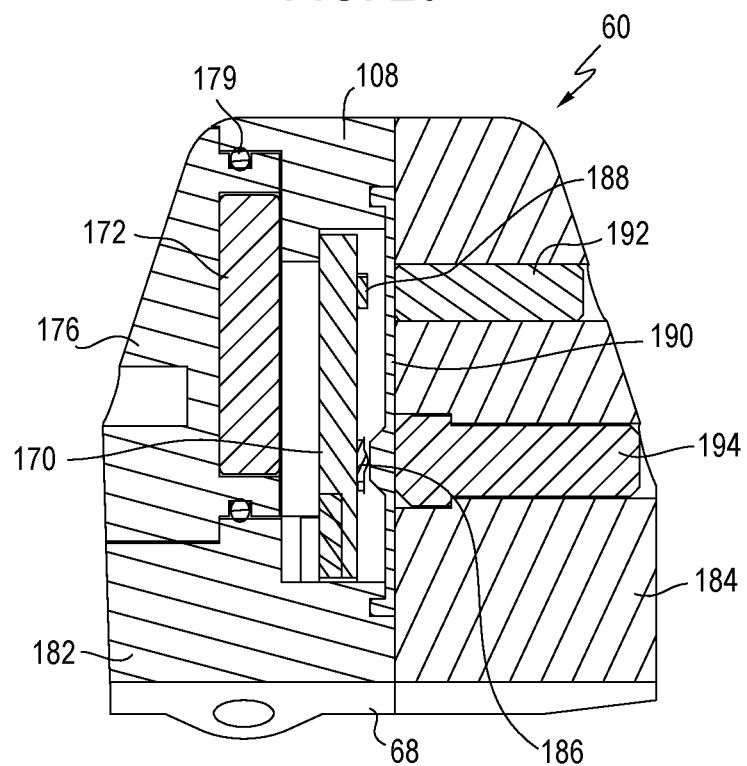

BICYCLE CONTROL SYSTEM

FIELD OF THE DISCLOSURE

The present application generally relates to a bicycle control system, including for example a brake and/or shift lever.

BACKGROUND

Bicycles are known to have various control systems for actuating various brake and gear changer systems. Typically, such control systems include one or more levers for initiating the actuation. In some systems, the same lever may be used to initiate both braking and gear shifting, with the movements of the lever effecting such actions being orthogonal, which may lead to inadvertent shifting during braking. Also in some systems, the lever may initiate gear shifting via wireless communication. Such systems, however, are typically bulky, expensive and difficult to repair if damaged due to the integrated configuration thereof.

SUMMARY

In one aspect, one embodiment of a bicycle control system includes a housing, referred to in one embodiment as a hood base, having an upper mounting surface. The hood base houses a brake actuation system, with the upper mounting surface positioned above the brake actuation system. A lever is pivotally coupled to the hood base about an axis and is operably coupled to the brake actuation system. An electronic module includes a housing releasably coupled to the upper mounting surface. The housing sealingly encloses at least one electronic component. In one embodiment, a cover is disposed over the hood base and electronics module.

In another aspect, one embodiment of a bicycle control system includes a housing and a lever pivotally coupled to the housing about both a shift axis and a brake axis, wherein the shift axis and the brake axis are non-orthogonal. In various embodiments, the shift axis and the brake axis define a forwardly opening acute angle. The acute angle may be defined relative to an inboard side of the housing, or relative to an outboard side of the housing.

In yet another aspect, one embodiment of a bicycle control kit includes a housing, e.g., a hood base, a brake actuation system housed in the housing and a lever pivotally coupled to the housing about an axis, wherein the lever is operably coupled to the brake actuation system. A first electronic module includes a first housing having a first outermost user interface shape, wherein the housing is configured to be releasably coupled to the upper mounting surface. The first electronic module encloses at least one first electronic component. A second electronic module includes a second housing having a second outermost user interface shape. The second housing is configured to be releasably coupled to the upper mounting surface. The second electronic module encloses at least one second electronic component. In one embodiment, the first outermost user interface shape is different than the second outermost user interface shape.

In yet another aspect, one embodiment of a bicycle control system includes a hood base and a lever assembly pivotally coupled to the hood base about both a shift axis and a brake axis. The lever assembly includes an arm and a shift actuator. The arm extends upwardly from the shift axis. The shift actuator is moveably coupled to the arm, and is adjustably moveable relative to the arm along an axis orthogonal to the shift axis.

The various embodiments of the bicycle control system provide significant advantages over other bicycle control systems. For example and without limitation, the combination of the housing and electronic module provides a low profile control system. The electronic module protects the electronic components, but may be quickly and easily replaced if one or more of the components are damaged or fail, without the need to replace the entire housing (e.g., hood base) and brake actuation components, and without incurring the attendant expense and labor associated therewith, including the need to remove and replace bar tape. Moreover, differently configured electronic modules, for example having different functions and/or shapes, may be quickly and easily exchanged thereby allowing the assembler and/or end user to reconfigure and customize the control system to accommodate the particular needs of the end user. For example, a high profile module suitable for one type of riding may be exchanged for a low profile module suitable for a different type of riding. Conversely, the same base housing may be used on different types of bicycles and handlebars, with the module associated for coupling with the selected base being selected to optimize the functionality thereof.

The non-orthogonal arrangement of the shift and brake axis also provides significant advantages. For example and without limitation, a single lever may be used to effect both the braking and shifting action, but with the relationship between the axes helping to prevent accidental actuation of one activity while intentionally performing the other, for example accidental shifting while braking, or vice versa.

The configuration of the shift actuator being moveably coupled to the arm along an axis orthogonal to the shift axis also provides significant advantages. For example and without limitation, the shift actuator may be adjusted to vary the distance the shift/brake actuator must be moved to actuate a switch in the electronic module. This may provide individual adjustments, as well as permit the same lever assembly to interface with different modules, having for example different switches with different displacements.

The foregoing paragraphs have been provided by way of general introduction, and are not intended to limit the scope of the claims presented below. The various preferred embodiments, together with further advantages, will be best understood by reference to the following detailed description taken in conjunction with the accompanying drawings.

BRIEF DESCRIPTION OF THE DRAWINGS

Objects, features, and advantages of the present invention will become apparent upon reading the following description in conjunction with the drawing figures, in which:

FIG. 19 is a cross-sectional view of the electronics module taken along line 19-19 of FIG. 17.

FIG. 20 is a cross-sectional view of the electronics module taken along line 20-20 of FIG. 17.

DETAILED DESCRIPTION OF THE DISCLOSURE

Figure 3:
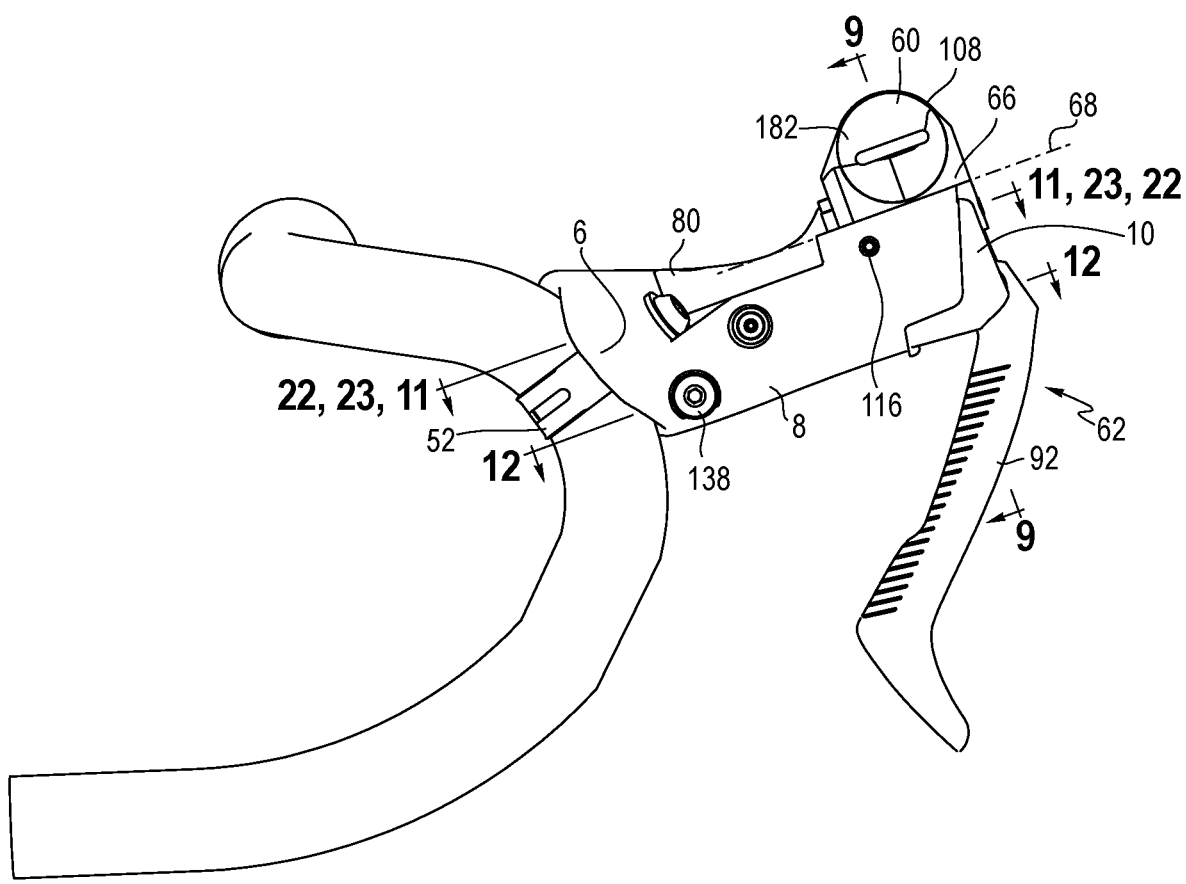
FIG. 3 is a side view of the bicycle control system shown in FIG. 2 with a hood cover removed.
Figure 4:
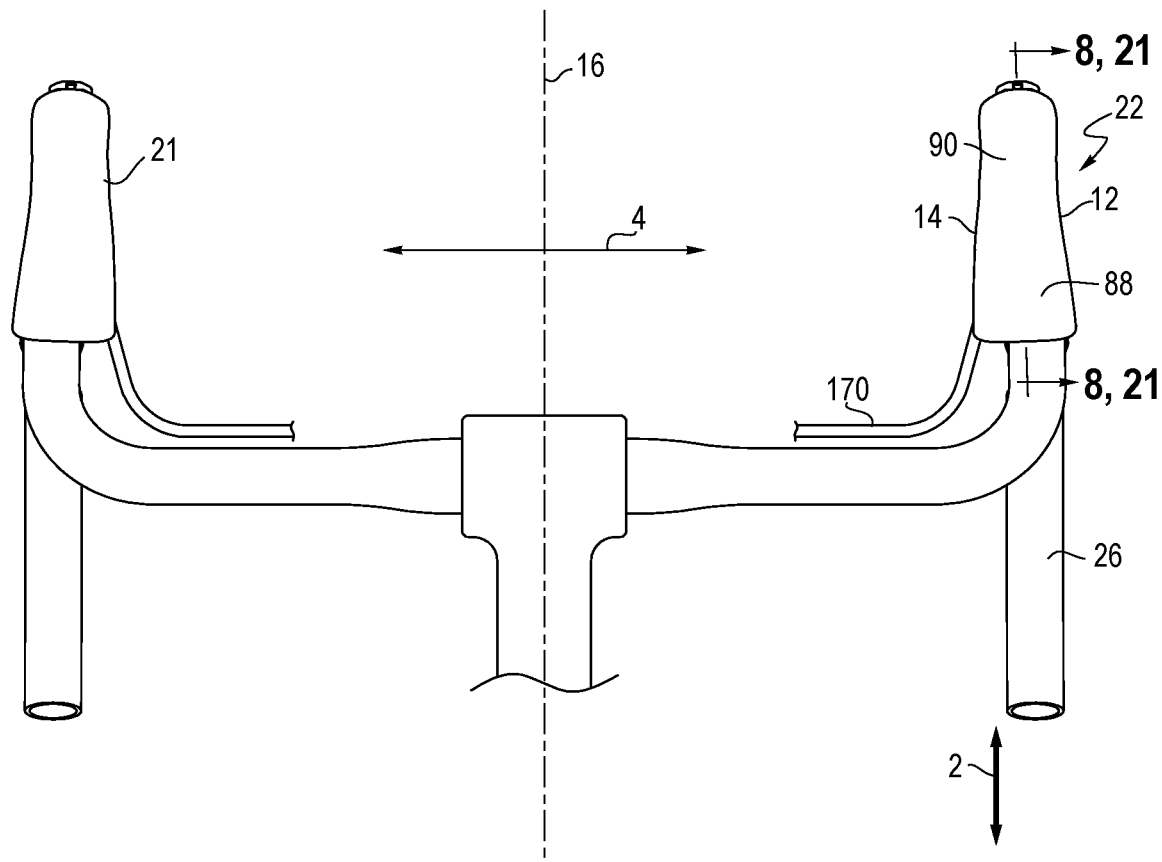
FIG. 4 is a top view of the drop-bar handle bar and bicycle control system shown in FIG. 2.
Figure 5:
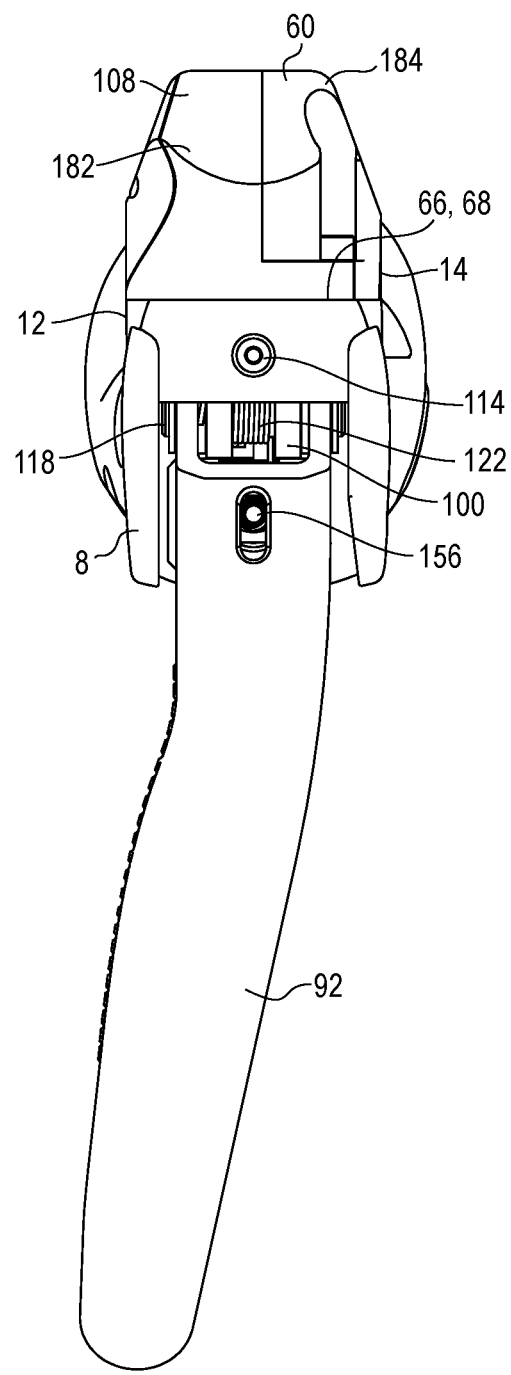
FIG. 5 is a top view of the bicycle control system shown in FIG. 3.
Figure 6:
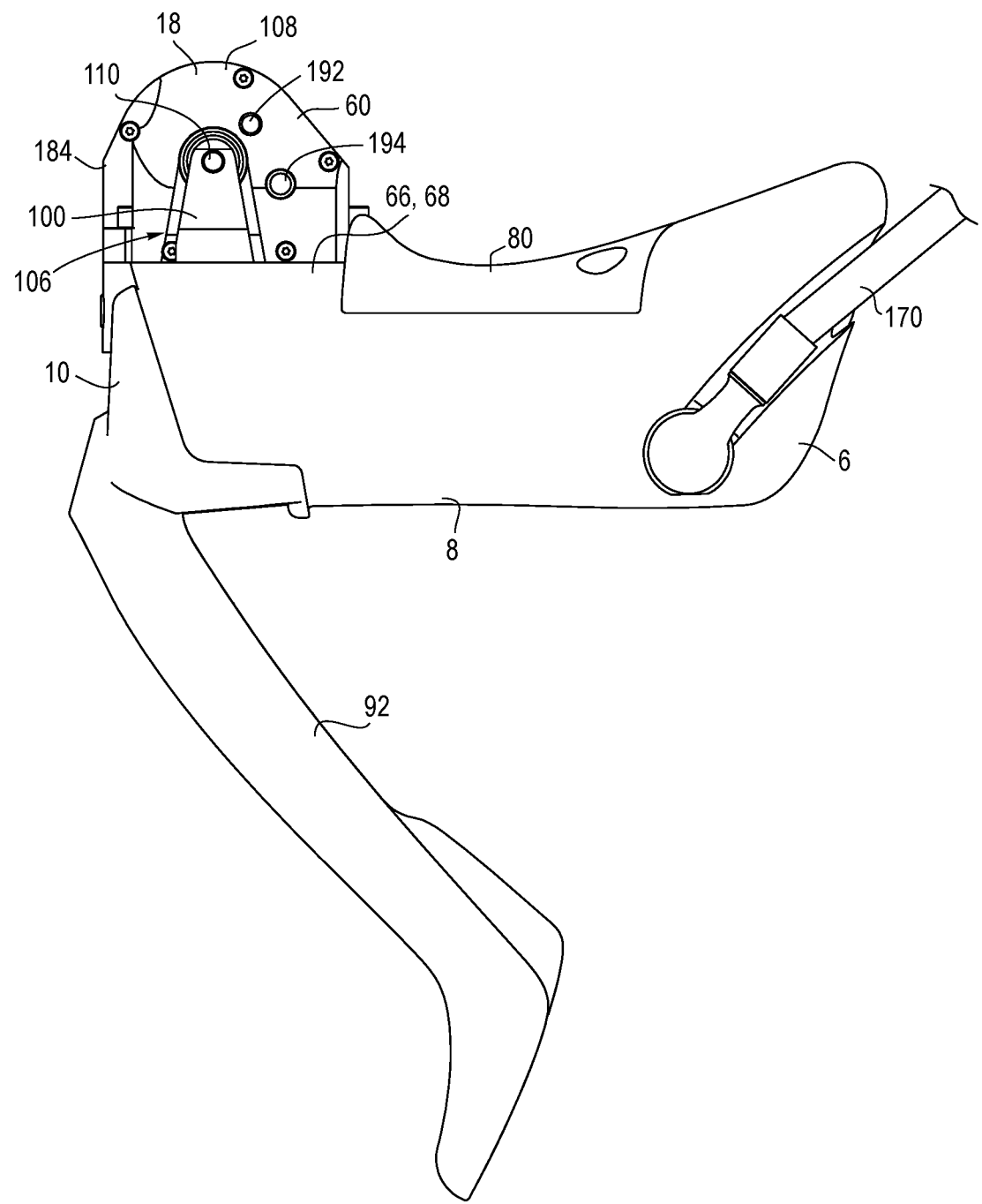
FIG. 6 is an inboard side view of the bicycle control system shown in FIG. 3.
Figure 8:
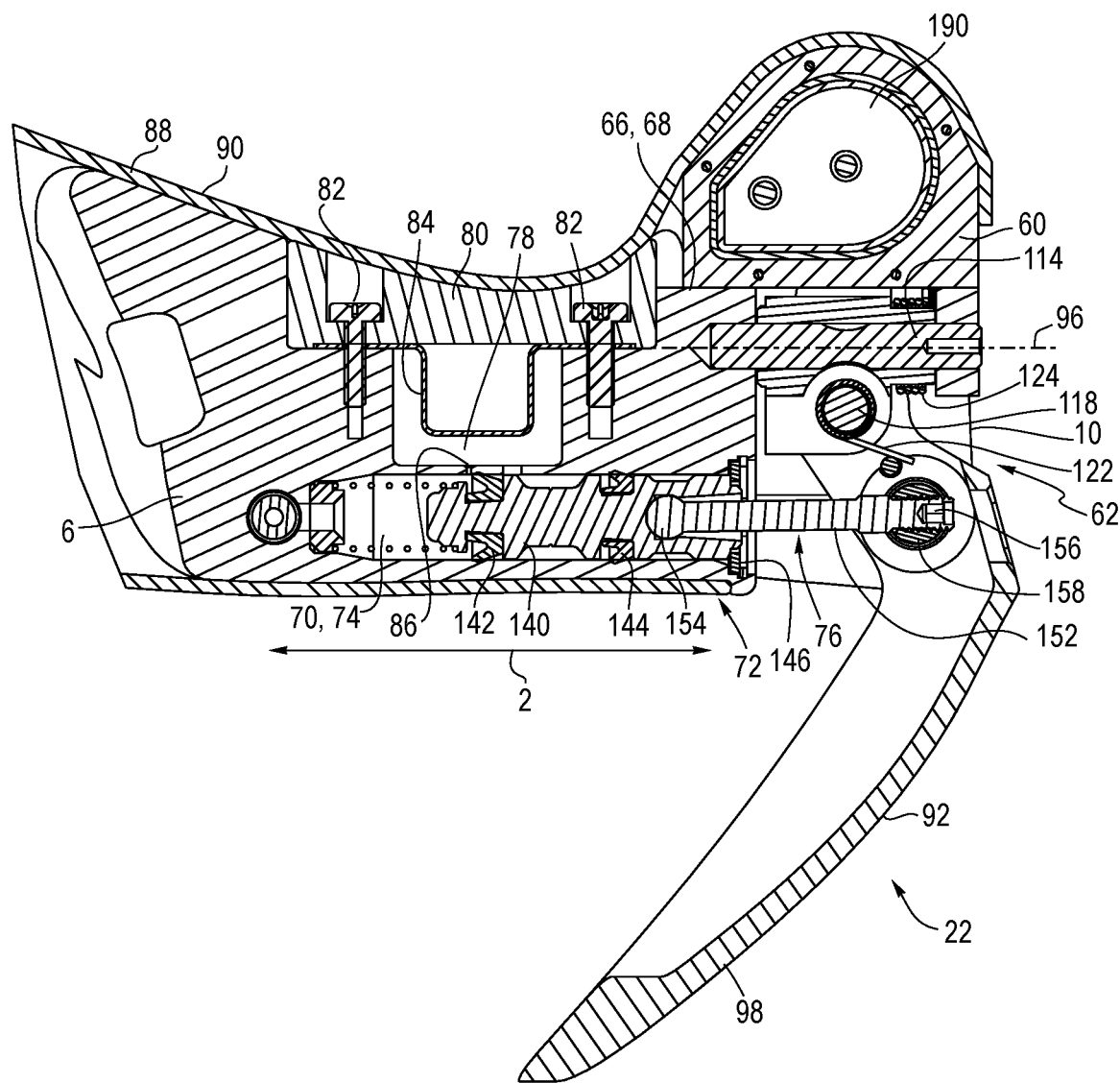
FIG. 8 is a cross-sectional view of the bicycle control system taken along line 8-8 of FIG. 4.

It should be understood that the term "plurality," as used herein, means two or more. The term "longitudinal," as used herein means of or relating to a length or lengthwise direction 2, for example a direction running along a length of a cylinder as shown in FIG. 8, but is not limited to a linear path. The term "lateral," as used herein, means situated on, directed toward or running in a side-to-side direction 4, as shown for example in FIG. 4. The term "coupled" means connected to or engaged with, whether directly or indirectly, for example with an intervening member, and does not require the engagement to be fixed or permanent, although it may be fixed or permanent. The terms "first," "second," and so on, as used herein are not meant to be assigned to a particular component so designated, but rather are simply referring to such components in the numerical order as addressed, meaning that a component designated as "first" may later be a "second" such component, depending on the order in which it is referred. It should also be understood that designation of "first" and "second" does not necessarily mean that the two components or values so designated are different, meaning for example a first direction may be the same as a second direction, with each simply being applicable to different components. The terms "upper," "lower," "rear," "front," "fore," "aft," "vertical," "horizontal," "right," "left," "inboard," "outboard" and variations or derivatives thereof, refer to the orientations of an exemplary bicycle, shown in FIG. 1, from the perspective of a user seated thereon. For example, a rear portion 6 of a hood base 8 corresponds to the mounting end thereof, while a front or forward portion 10 corresponds to the opposite portion or end longitudinally spaced therefrom along the longitudinal axis 2, as shown for example in FIG. 3. The outboard side 12 of the hood base corresponds to the side facing outwardly from the hood base away from a centerline plane 16, while the inboard side 14 corresponds to the side facing inwardly toward the centerline as shown for example in FIG. 4. The term "transverse" means non-parallel. More generally, the terms "outer" and "outwardly" refers to a direction or feature facing away from a centralized location, for example the phrases "radially outwardly," "radial direction" and/or derivatives thereof, refer to a feature diverging away from a centralized location. Conversely, the terms "inward" and "inwardly" refers to a direction facing toward the centralized or interior location. The term "subassembly" refers to an assembly of a plurality of components, with subassemblies capable of being further assembled into other subassemblies and/or a final assembly, such as the bicycle.

Bicycle

Figure 1:
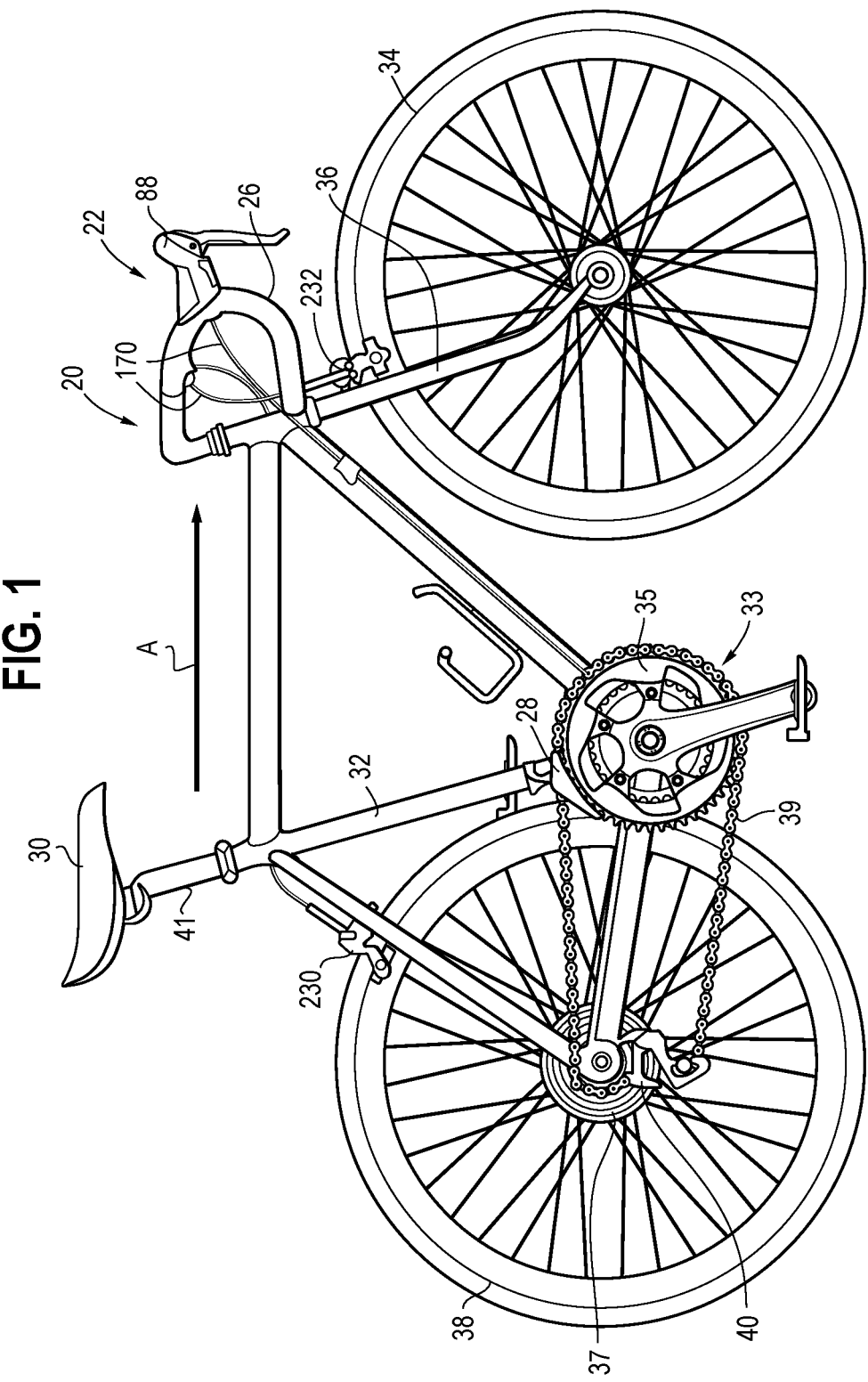
FIG. 1 is a side view of a drop-bar style bicycle with wireless components installed thereon.

FIG. 1 illustrates one example of a human powered vehicle on which a bicycle subassembly. In this example, the vehicle is one possible type of bicycle 20, such as a road or cyclocross bicycle, but it should be understood that other types of bicycles are also available, including mountain bicycles. The arrow "A" depicts a normal riding or forward moving direction of the bicycle. The bicycle has a frame 32, a drop style handlebar 26 near a front end of the frame, and a seat or saddle 30 for supporting a rider over a top of the frame. The bicycle also has a first or front wheel 34 carried by a front fork subassembly 36 supporting the front end of the frame, the front fork subassembly constructed in accordance with the teachings of the present disclosure. The bicycle also has a second or rear wheel 38 supporting a rear end of the frame. The front and rear ends of the frame may be supported by front and/or rear suspension components in some embodiments. The bicycle has a drive train 33 with a crank assembly 35 that is operatively coupled via a chain 39 to a rear cassette 37 near the hub providing a rotation axis of the rear wheel. The crank assembly includes at least one, and typically two, crank arms and pedals, along with at least one front sprocket, or chain ring. A rear gear change device 40, such as a derailleur, is disposed at the rear wheel to move the chain through different sprockets of the cassette. In one embodiment, a front gear changer device 28, such as a derailleur, may be provided to move the chain through multiple sprockets of the crank assembly. The front and rear gear changers may be actuated with non-mechanical (e.g., wired, wireless) drive systems, for example as disclosed in U.S. Pat. No. 8,909,424, entitled "Electronic Shifting Systems and Methods," the entire disclosure of which is hereby incorporated herein by reference. Brake assemblies 230, 232 are shown as being associated with the rim of each wheel, but may also be associated with a disc located adjacent the wheel hub.

In the illustrated example, the saddle 30 is supported on a seat post subassembly, including a tube having an end portion received in a top of a frame seat tube of the frame, which defines a socket. The seat post subassembly 41 may include a suspension seat post system or a dropper seat post system, which may be controlled electronically (wired or wireless) or mechanically.

Figure 2:
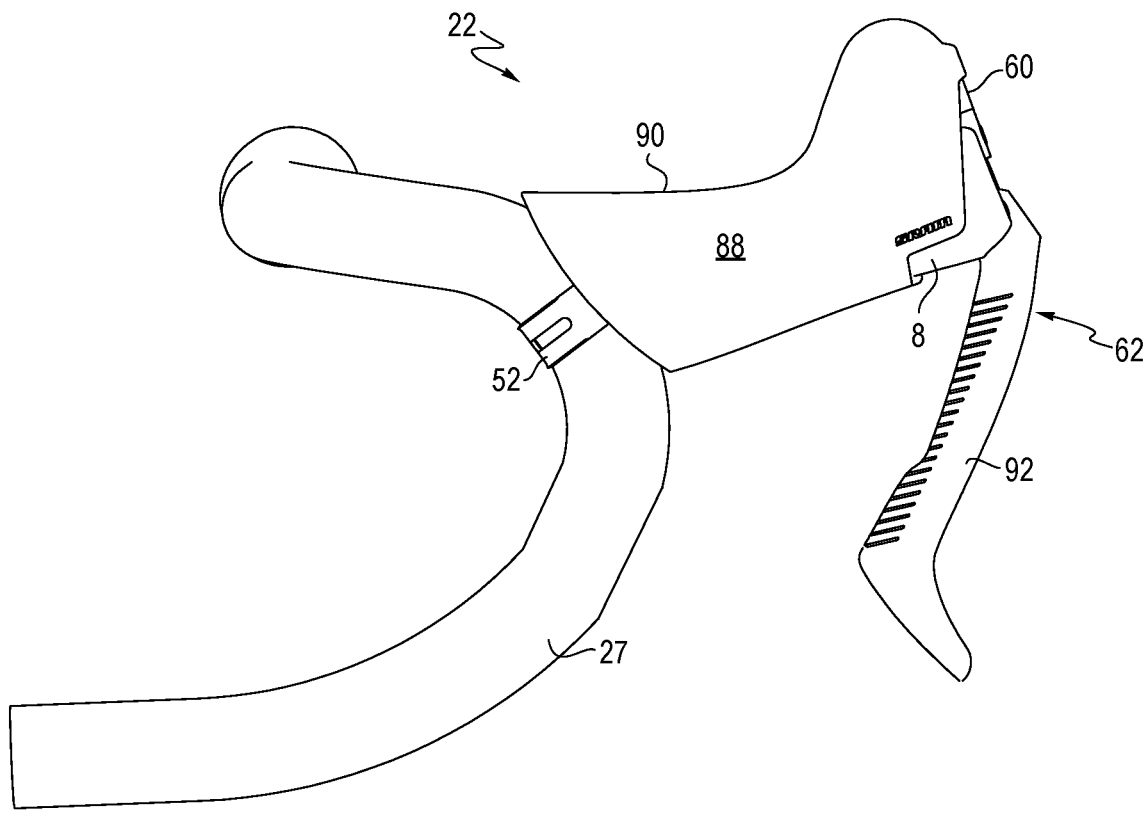
FIG. 2 is a side view of a drop-bar handle bar with a bicycle control system coupled thereto.

Bicycle Control System:

Referring to FIG. 2, one embodiment of a bicycle control system 22 is shown as being attached to the handle bar 26 with a mounting member 52, shown as a clamp that surrounds the handle bar tube 27. The mounting member 52 and handle bar tube 27 may be covered with bar tape as shown in FIG. 1. Referring to FIGS. 5-20, the bicycle control system includes a base portion or device housing, referred to in one embodiment as a hood base 8, an electronic module 60 releasably coupled to the hood base 8 and a lever 92, or lever assembly 62, pivotally coupled to the hood base.

In one embodiment, a first bicycle control system 22 is provided on the right side of the handlebar, and a second bicycle control system 21 is provided on the left side of the handlebar, with the first and second bicycle control systems 22, 21 being a mirror image of each other. In one embodiment, the right side control system 22 is used for braking one of the bicycle's wheels, for example the rear wheel 38, and performing one of an upshift and a downshift operation, for example actuating one or both of the front and rear gear change devices 28, 40. The left side control system 21 is used for braking the other of the bicycle's wheels, for example the front wheel 34, and performing the other of an upshift or a downshift operation, for example actuating one or both of the front and rear gear change devices 28, 40.

Hood Base:

The base portion or device housing, referred to in one embodiment as the hood base 8, has a rear portion 6 with a concave recess shaped to receive the convexly curved outer surface of the handlebar tube 27, with the mounting member, or clamp, 52 securing the rear portion to the tube 27. It should be understood that the base housing may be configured to mount on other types of handle bars different from the drop bar configuration, including flat bars, riser bars, bullhorns and the like, which may be used on various mountain bicycles. The hood base 8 further includes the forward portion 10, which is longitudinally spaced from the rear portion 6 along the longitudinal axis 2. An upper mounting surface 66 is positioned on the forward portion in one embodiment. It should be understood that the upper mounting surface may be positioned along any portion of the base housing. In one embodiment, the upper mounting surface is planar, or defines a mounting plane 68, and also defines a portion of the overall upper surface of the hood base. The hood base has a lower cavity 70 that houses a brake actuation system 72, and defines a master cylinder. The lower cavity 70 opens into a forwardly positioned recess 76 shaped to receive a portion of the lever 92. The hood base 8 also has a fluid reservoir 78 disposed above the master cylinder and a removable cover 80 disposed over the reservoir and releasably coupled to the hood base, for example with fasteners 82 such as screws, tabs, etc. The cover 80, or upper surface thereof, defines another portion of the overall upper surface of the hood base. A bladder 84 is disposed in the reservoir. The cover 82 may removed to fill the reservoir 78 with hydraulic fluid, and then reinstalled to seal the reservoir and prevent leakage therefrom. The reservoir 78 and brake actuation system 72 are both positioned below the mounting plane 68 and mounting surface 66. The cover 80 and rear portion of the hood base define portions of the upper surface of the hood base having an upwardly facing concave shaped surface, which is shaped to receive and interface with the user's hands. A timing port 86 allows fluid communication between the reservoir 78 and the master cylinder 74.

The hood base is made of glass filled nylon, carbon filled nylon, aluminum, nylon (either glass or carbon filled) molded over aluminum, or other suitable materials. A flexible elastomeric cover 88, known as a hood cover, covers the brake-shift control, including the hood base 8 and electronic module 60, and defines an outermost, user interface surface 90, which provides a grippable surface for the user.

Lever Assembly:

The lever assembly 62 includes the lever 92, which is pivotable relative to the hood base 8 about a brake axis 94. The lever 92 is operably coupled to the brake actuation system 72. The lever assembly 62 and lever 92 also are pivotable relative to the hood base 8 about a shift axis 96. The shift axis 96 and brake axis 94 are non-parallel, and are orthogonal in one embodiment, with the shift axis 96 positioned above the brake axis 94. In this way, the bicycle control system, and the single lever 92, provides both brake and shift control for the bicycle.

In one embodiment, the lever assembly 62 is configured with a lower grippable portion 98, defined by the lever 92, and an upper pivoting portion 100. The pivoting portion 100 is pivotable with the lever about the shift axis 96, but does not pivot with the lever about brake axis 94. Rather, the lever 92 moves independently of the pivoting portion about the brake axis 94. The pivoting portion 100 includes an arm portion 102 that extends upwardly from the shift axis 96, and above the upper mounting surface 66 and plane 68. The arm includes an end portion 104 disposed in a recess 106 formed in an electronics module housing 108. An inboard shift actuator 110 is moveably coupled to the arm. The shift actuator is 110 adjustably moveable relative to the arm along an axis 112 orthogonal to the shift axis 96. In one embodiment, the shift actuator 110 is threadably engaged with the end portion 104, and may be screwed in and out along the axis 112.

Figure 11:
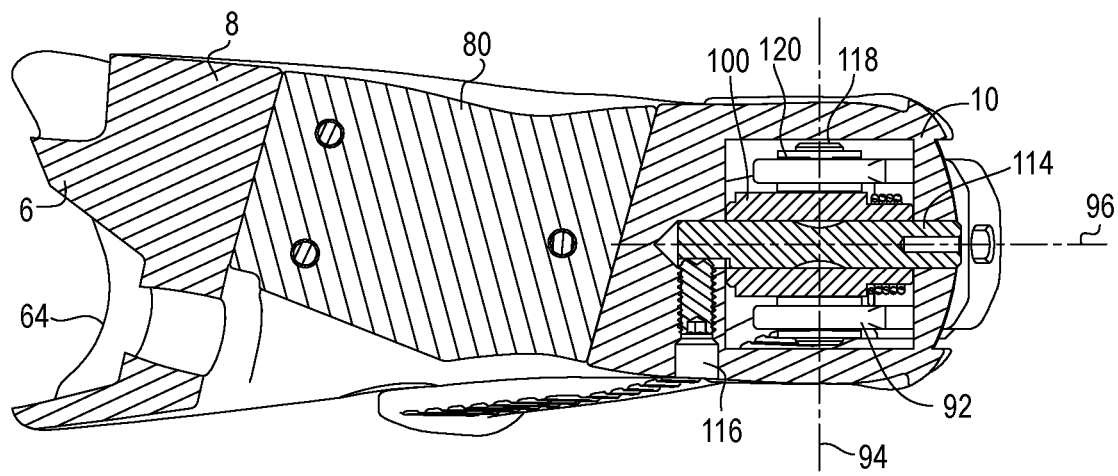
FIG. 11 is a cross-sectional view of the bicycle control system taken along line 11-11 of FIG. 3.

Referring to FIG. 11, a shift axle 114 is received in a hole in the hood base 8, and may be fixed in place by a set-screw 116. The shift axle 114 defines the shift axis 96. The pivoting portion 100 is pivotable around the shift axle 114. A brake axle 118 is received through an opening defined in the pivoting portion 100 and extends through holes defined by a pair of lugs on the lower grippable portion 98, or brake-shift lever 92. The brake axle 118 defines the brake axis 94. The brake axis 94 is substantially perpendicular, or orthogonal, to the shift axis 96 in one embodiment. Retaining rings 120 retain the brake axle 118 and prevent the brake axle from translating along the brake axis 94. The shift-brake lever 92 is pivotable around the brake axle 118 and axis 94. A brake bias spring 122, shown as a torsion spring in one embodiment, biases the brake lever toward a braking position. It should be understood that the brake bias spring may be configured as a compression or tension spring. A shift return spring 124, shown as a torsion spring in one embodiment, engages and biases the pivoting portion toward an at-rest, non-shifting position.

Figure 22:
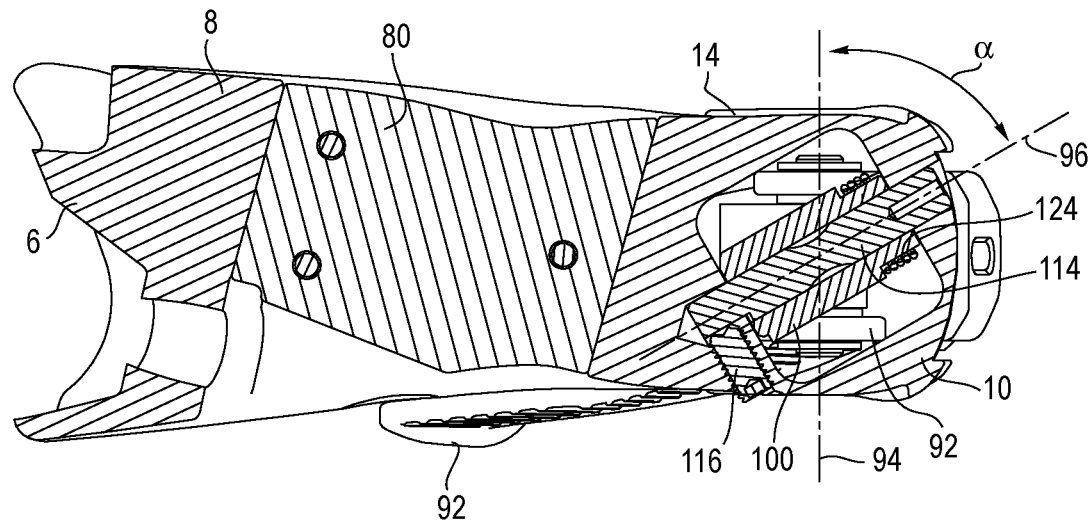
FIG. 22 is a cross-sectional view of an alternative embodiment of a bicycle control system taken along line 22-22 of FIG. 3.
Figure 23:
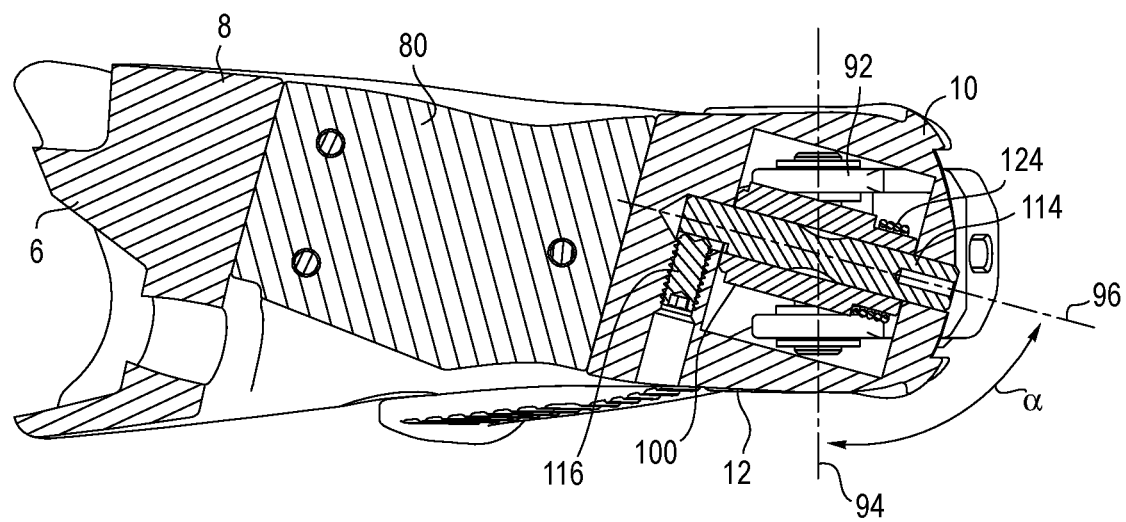
FIG. 23 is a cross-sectional view of an alternative embodiment of a bicycle control system taken along line 23-23 of FIG. 3.

In an alternative embodiments shown in FIGS. 22 and 23, the shift axis 96 and the brake axis 94 are non-orthogonal, i.e., not perpendicular. Rather, the shift axis 96 and the brake axis 94 define a forwardly opening acute angle (a). As shown in FIG. 22, the acute angle (a) is defined relative to an inboard side 14 of the hood base, i.e., relative to the portion of the axis 94 extending inboard. In the embodiment of FIG. 23, the acute angle (a) is defined relative to an outboard side of the hood base, i.e., relative to the portion of the axis 94 extending outboard. As such, the shift axes 96 of the two embodiments are inclined in an opposite direction relative to a centerline extending perpendicular to the brake axis 94, with the orientations being a mirror image of each other. In various embodiments, the angle (a) is preferably between 45° and 60°. The shift axis 96 is angled or inclined in such a way that as the user moves the shift-brake lever 92 in the braking direction to brake, the shift-brake lever 92 will be biased to pivot around the shift axis 96 away from the shifting direction. In this way, the system helps prevent accidental shifting while braking.

Figure 12:
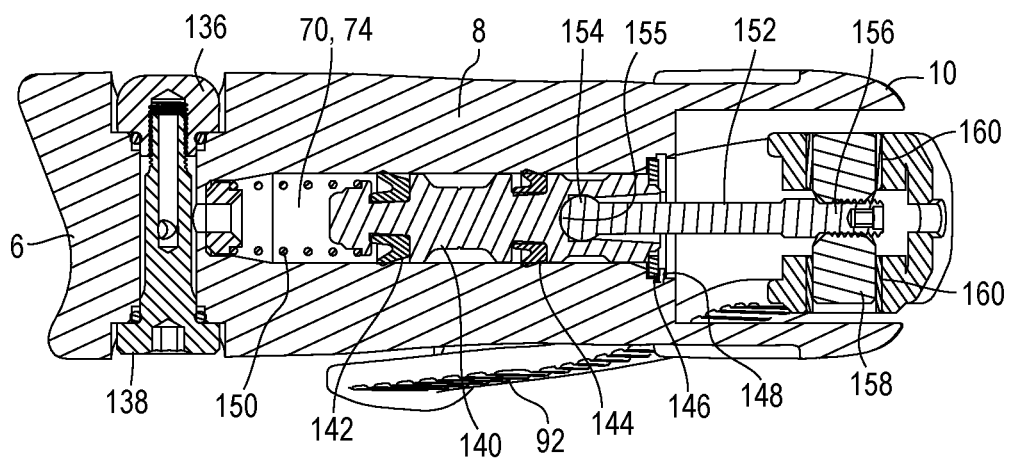
FIG. 12 is a cross-sectional view of the bicycle control system taken along line 12-12 of FIG. 3.
Figure 13:
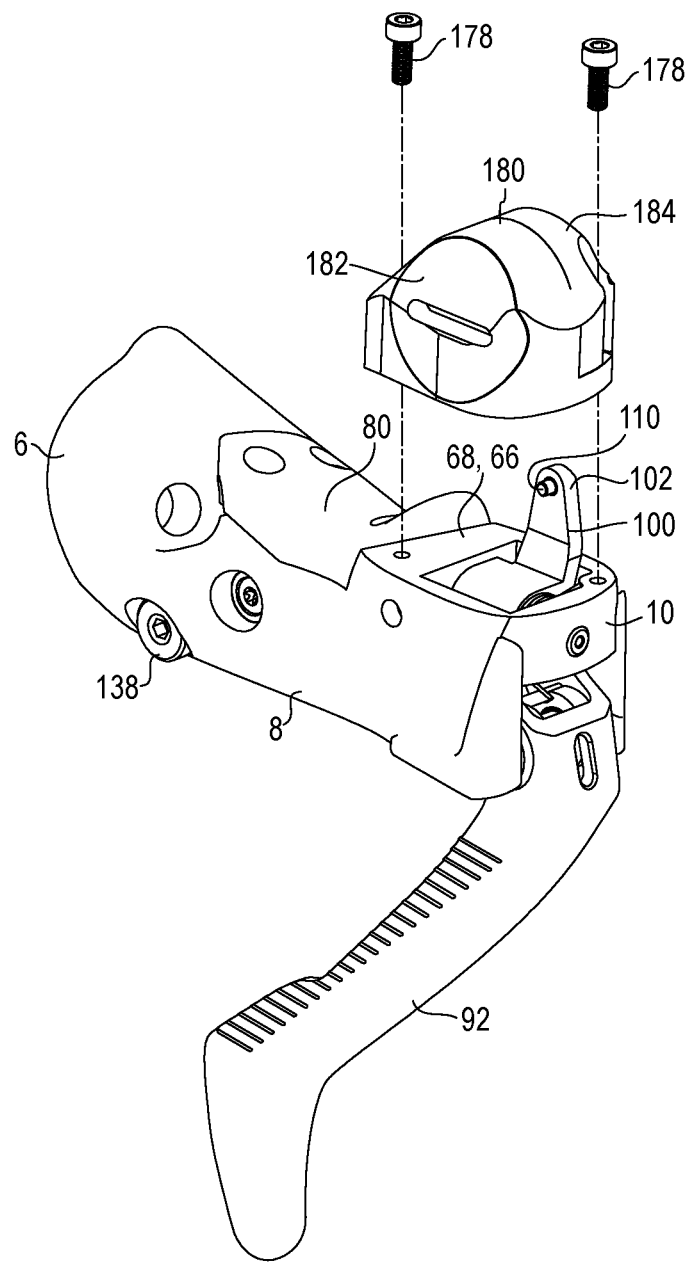
FIG. 13 is an exploded perspective view of one embodiment of a bicycle control system.
Figure 14:
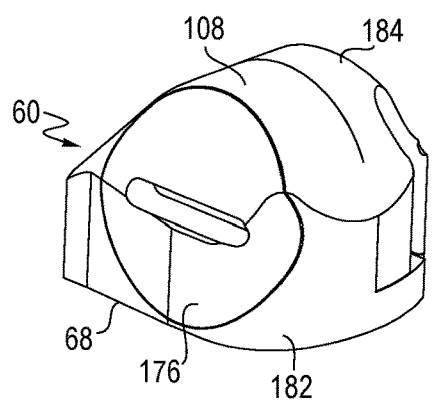
FIG. 14 is an outboard perspective view of one embodiment of an electronics module.
Figure 15:
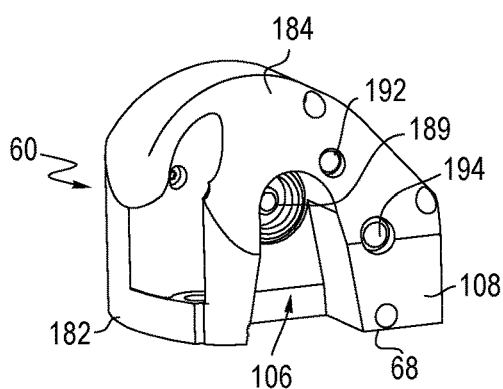
FIG. 15 is an inboard perspective view the electronics module shown in FIG. 14.
Figure 16:
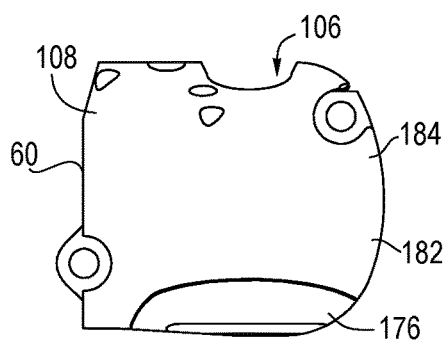
FIG. 16 is a top view of the electronics module shown in FIG. 14.
Figure 17:
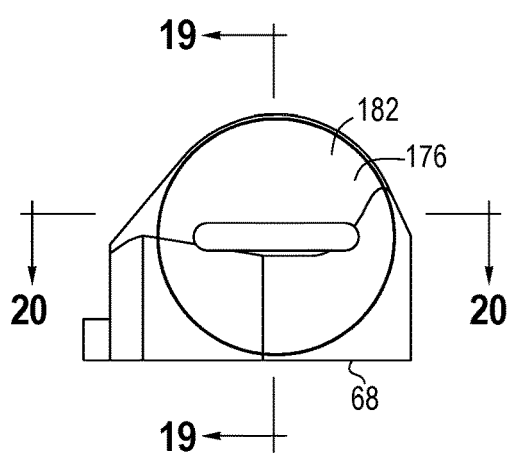
FIG. 17 is an outboard side view of the electronics module shown in FIG. 14.
Figure 18:
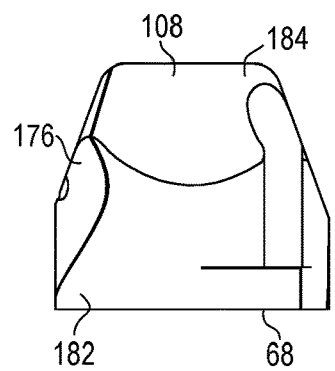
FIG. 18 is a front view of the electronics module shown in FIG. 14.

Brake Actuation System:

The lever 92 is operably coupled to the brake actuation system 72, configured as a hydraulic brake actuation system in one embodiment. In other embodiments, the brake actuation system may include a cable translatable within a cable guide and connected to a brake assembly. Referring to FIGS. 8 and 12, the master cylinder 74 is formed in the hood, or the cavity 70 defined thereby. Alternatively, the master cylinder may be a separate part that is received in the hood, for example a cavity defined therein. The master cylinder 74 is in fluid communication with a banjo assembly consisting of a banjo fitting 136 and a banjo retaining member 138. A piston 140 is received in the master cylinder. A first piston seal 142 and a second piston seal 144 are located on the piston and form a fluid-tight seal between the piston and the interior surfaces of the master cylinder. A washer 146 is received in the master cylinder and is retained by a retaining ring 148. A piston return spring 150 biases the piston away from the braking direction and towards a rest position in which the piston abuts the washer 146. A pushrod 152 has a substantially ball-shaped first end 154 that is received in a recess or socket 155 defined by the piston. A second end 156 of the pushrod is threaded into a cross dowel 158, which is cylindrical and configured with threads that receive the threaded second end 156 of the pushrod. The cross dowel is slidably and rotatably received in bushings 160 in the shift-brake lever 92.

Figure 21:
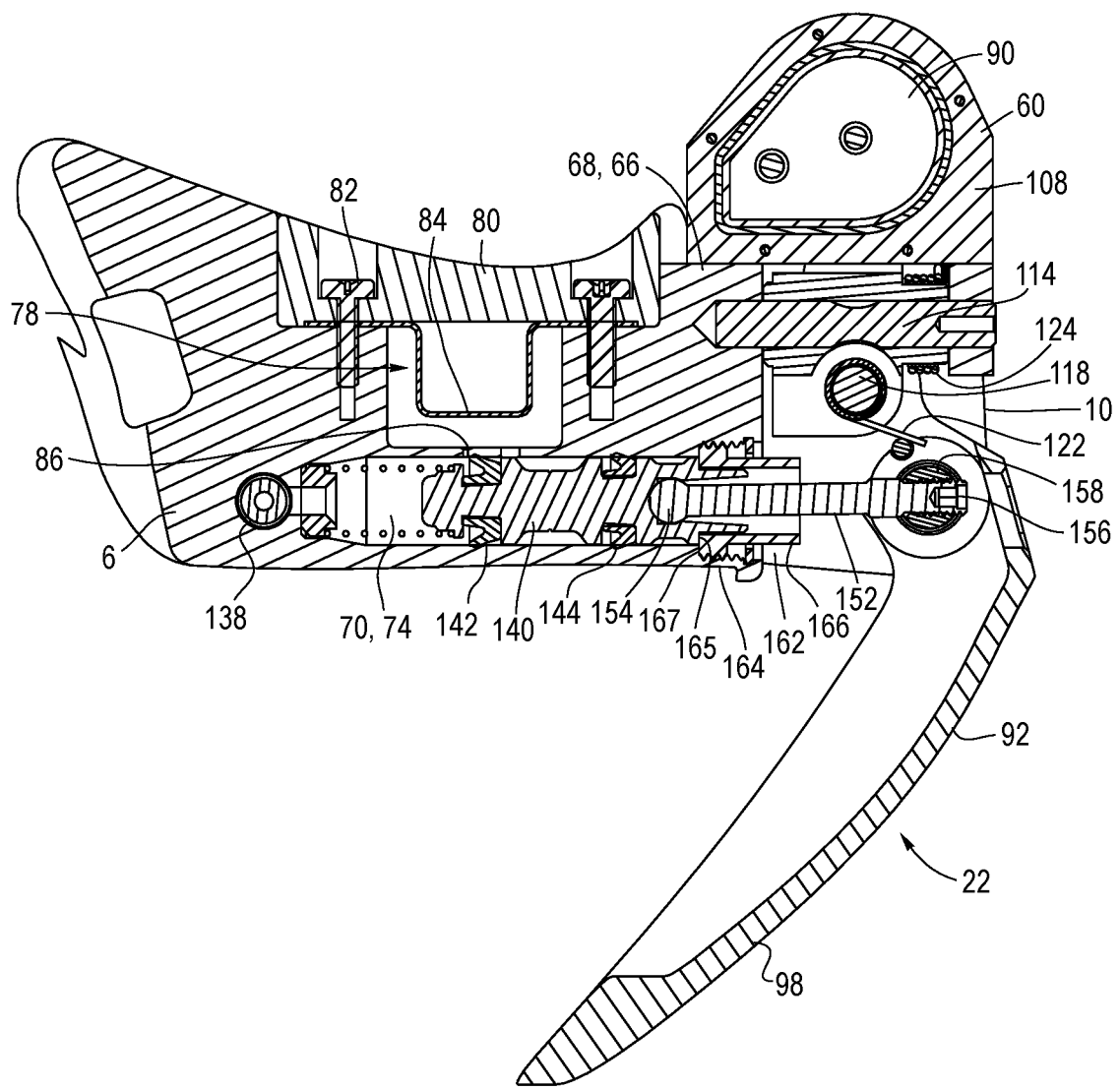
FIG. 21 is a cross-sectional view of alternative embodiment of a bicycle control system taken along line 21-21 of FIG. 4.

In an alternative embodiment shown in FIG. 21, the washer that the piston stops against is replaced by an adjustable member 162, herein referred to as an adjuster. The adjuster, or stop member, is threaded and is threadably engaged with a corresponding threaded portion 164 defined in the hood at a mouth of the cavity 70. The piston includes a stop surface, or first stop 165, that abuts or stops against an end of the adjuster 162, defining a second stop 167, to define the piston's home position. When the user manually rotates the adjuster 162 relative to the hood base 8, the adjuster moves axially along the longitudinal direction 2, and the home position of the piston moves along with it. In doing so, the distance between the timing port 86 and the first piston seal 142 is varied. When the user actuates the shift-brake lever in the braking direction, the piston 140 doesn't begin to push hydraulic fluid through a hydraulic hose 170 until the first piston seal has crossed the timing port 86. Thus, the total amount that the shift-brake lever must move to brake the wheel will vary depending on how the user adjusts the adjuster. The adjuster, or stop member, has an end port with an exposed tool interface 166. The user may engage the interface 166 with a tool, such as a wrench, and rotate the adjuster to move it longitudinally.

Electronic Module

The electronic module 60 includes a housing 108 releasably coupled to the upper mounting surface 66, for example with fasteners 178. The housing 108, or an interior chamber thereof, sealingly encloses at least one, and preferably a plurality of, electronic component(s). In one embodiment, the electronic component(s) are hermetically sealed (air tight) in the housing, while in other embodiments the chamber is water proof. In various embodiments, the electronic component includes at least one of a processing unit, a wireless radio, an antenna, a power source 172 and a switch 174, and may be configured as a printed circuit board 171 and the power source 172. The module housing includes a cover 176 that is moveable from, or between, a closed position to an open position, with a gasket or seal 179 disposed between the door and housing to seal the interior thereof in the closed position. In one embodiment, the power source 172 includes a battery. The battery is removable from the housing when the cover 176 is in the open position.

The electronics module is a separate module that is disposed on the mounting surface and attaches to the hood base with the fasteners 178, e.g., a pair of screws. In other embodiments, the electronics module housing may be secured to the hood base with snap tabs, hooks and/or other types of mechanical fasteners, or may be secured with adhesive, such as glue or tape, or may simply be secured to the base with the hood cover. The electronics module 60 forms part of the final shape of the shift-brake control system 22, and has an outermost user interface surface 180. The electronics module housing 108 may be made two-piece, with an outboard housing 182 and an inboard housing 184, which are fixedly connected together, for example and without limitations by screws, adhesive, and/or ultrasonic welding, combinations thereof, or some other means. The outboard housing 182 includes the sealed battery cover 176 or door that is removable by the user to change the battery. The battery door may be configured as a "bayonet" type. The power source, or battery, may be a coin battery, for example a 2032 coin cell battery, that is received in an opening formed between the battery cover 176 and the outboard housing 182. Electrical contacts (not shown) connect the battery to the PCB (printed circuit board) 171. The PCB includes several electronic components mounted on it, including a CPU, a wireless radio, and antenna, an electrical switch 174 that will be actuated by the shift-brake lever, an electrical switch 186 that is used for another function that will be described later, and an LED 188.

A membrane seal 190 is configured as a flexible, transparent seal that covers an opening in the outboard housing 182 and forms a watertight seal between the outboard housing 182 and the inboard housing 184. An inner switch actuator 189 is slidably received in a hole in the inboard housing 184, with a spring 191 disposed between the outboard switch actuator 189 and the inboard switch actuator 110. Referring to FIG. 20, the LED 188 is able to shine through the transparent membrane seal 190 and through a light pipe 192, such that an indicator light is visible to the user to indicate a status of the system. A button actuator 194 is slidably received in a hole in the inboard housing 184, and is actuatable by the user. The electronics module may also include a display screen, and may be wirelessly connected to a smart device, such as a mobile telephone or tablet. When actuated by the user, the button actuator 194 deflects the flexible membrane 190 to actuate the electrical switch 186, which may be configured as a function button. The function button actuator 194 may preferably be configured for, but is not limited to, wirelessly pairing the shift-brake control 22 to one or both of the gear shift changers 28, 40, or wireless derailleurs. While a single function button is shown, multiple function buttons may be incorporated into the electronics module, and may be used for such functions as operating lights, suspension controls, dropper seat posts, etc. The membrane 190 seals the cavity including the switch, and separates the switch and the end portion 104. In one embodiment, the module also includes an electronic component configured as an LED. The module housing includes a light pipe 192 extending between the membrane 190 and an outer surface of the housing 108. The module may also include the function button actuator 194 extending between the membrane 190 and an outer surface of the module housing 108.

The inboard shift actuator 110 is moveably coupled to the arm portion 102 and may be moved relative to the arm portion 102 toward and away from the membrane 190. As the shift actuator 110 is pivoted about the shift axis 96 between an at-rest position and a shift actuation position, the inboard shift actuator 110 engages the outboard switch actuator 189 and actuates the switch 174 when moved to the shift actuation position.

Figure 7:
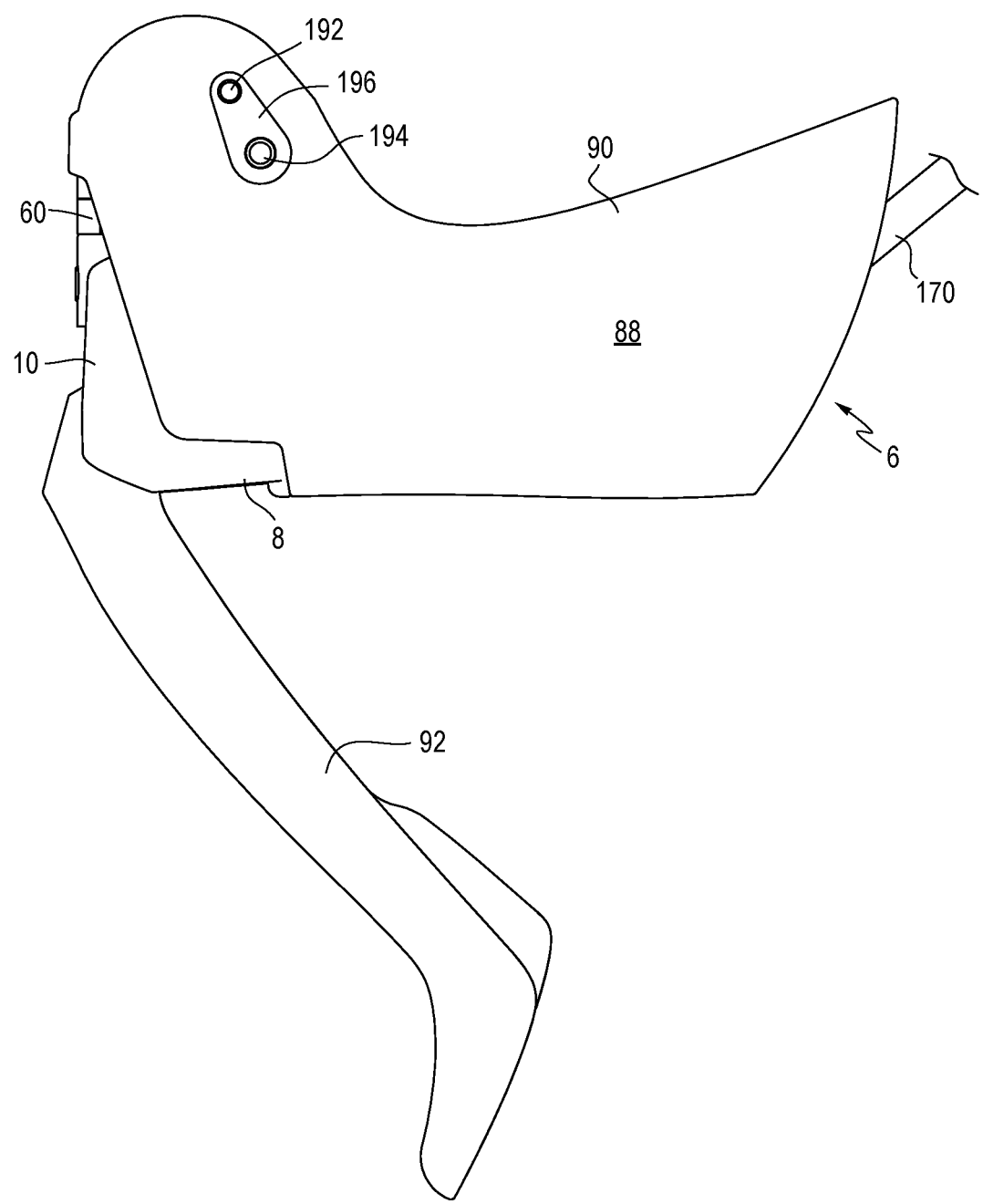
FIG. 7 is an inboard side view of the bicycle control system shown in FIG. 6 with a hood cover applied thereto.

Referring to FIG. 7, an opening 196 in the hood cover 88 provides user access, and visibility, to the LED/light pipe 192 and function button 194. Alternatively, the opening 196 in the hood cover may be omitted, and the user may partially remove the hood cover to access the LED and function buttons, or the hood cover may be transparent, allowing the light from the LED to permeate the hood cover, while also being sufficiently flexible to allow the user to actuate the function button through the cover.

Figure 24A:
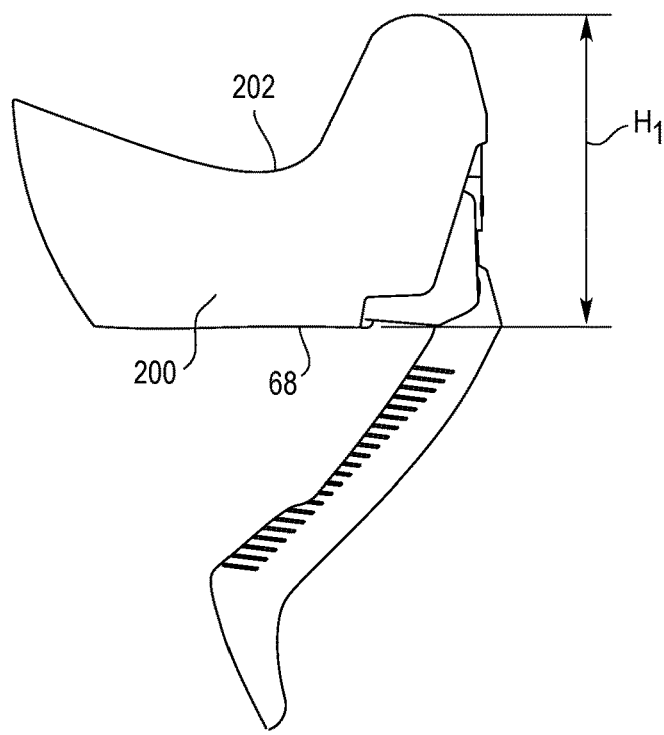
FIGS. 24A and 24B are side views showing different embodiments of a first and second electronic modules which may be attached to a same base.
Figure 24B:
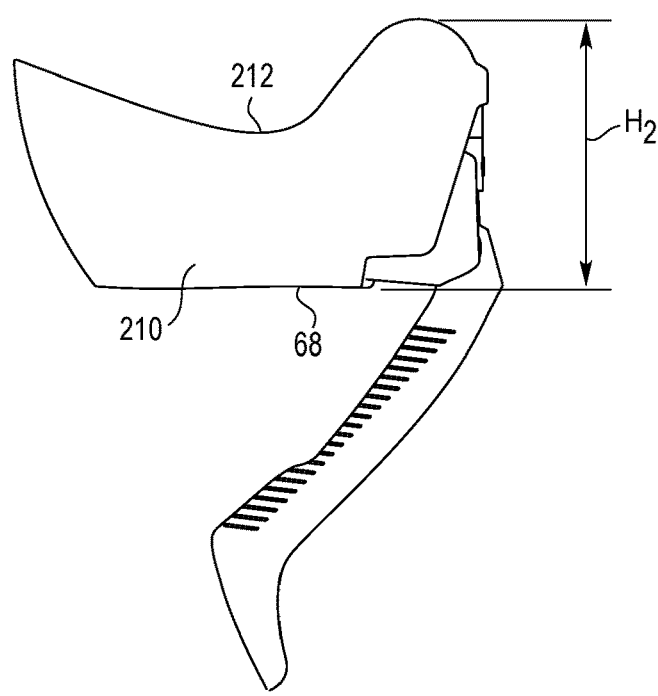

Referring to FIGS. 24A and B, differently configured electronic modules may be coupled to the same hood base 8. For example, as shown in FIG. 24A, a first electronic module 200 is configured with a first housing having a first outermost user interface shape 202, while in FIG. 24B a second electronic module 210 is configured with a second housing having a second outermost user interface shape 212. The first outermost user interface shape 202 is different than the second outermost user interface shape 212. For example, in one embodiment, the first housing is taller than the second housing, with the first housing having a first height H1 and the second housing having a second height H2, with H1>H2. In other embodiments, the heights may be the same, but with the outermost curvatures (e.g., top) or shapes being different, or with the housings having different (lateral) widths or lengths (longitudinal). In other embodiments, the electronic modules may be the same or different shapes and/or sizes, but may also house different electronic components, or provide different functionalities. Differently configured hood covers 88 are also provided to mate with the different combinations of electronic modules and the hood base, and may be removed and replaced with the appropriate hood cover suited for the particular combination. For example, the hood covers may be differently shaped, or may have different openings sized and positioned to align with differently configured function buttons and/or LED(s), or other indicators/actuators.

In operation, the user, whether the end user or an assembler, may simply select the desired electronic module 200, 210 and secure it to the housing, e.g., hood base 8, and cover the combination with an appropriate sized cover. In this way, the assembler may inventory a single base housing that is compatible with a plurality of different electronic modules. Or, an end user may select a desired module to be associated for a particular riding style or function (e.g., shifting, dropper seat post, suspension tuning), and couple the module to the base housing for a particular riding experience. At the same time, if the electronics module, or any of the components therein, becomes damaged or stops functioning, the electronics module may be quickly and easily replaced without having to remove or replace the base housing.

Operation:

In operation, the user moves the shift-brake lever 92 in the braking direction, e.g., rotating the lever clockwise around the brake axis 94 when viewed from a right side. The cross dowel 158 drives the pushrod 152 rearwardly, which in turn drives the piston 140 to the left, pushing hydraulic fluid out of the master cylinder 74 through the timing port 84 into the fluid reservoir 78. After the first piston seal 142 has crossed the timing port 86, fluid is no longer able to flow out of the master cylinder into the fluid reservoir and is only able to exit the master cylinder via the fluid ports in the banjo assembly. Thus, as the user continues to move the shift-brake lever in the braking direction, fluid flows through the banjo assembly, and through a hydraulic hose 170 to a brake caliper 230, 232 located adjacent the rear and front bicycle wheels, with the brake caliper applying pressure to the bicycle wheel, or disc associated therewith, causing a braking action on the wheel.

When the user releases the shift-brake lever 92, the piston return spring 150 pushes the piston 140 back towards its previously described home position, and hydraulic fluid flows back into the master cylinder 74. It should be noted that the brake bias spring 122 biases the shift-brake lever towards the braking direction, but is not strong enough to overcome the opposing bias of the piston return spring 150.

Figure 9:
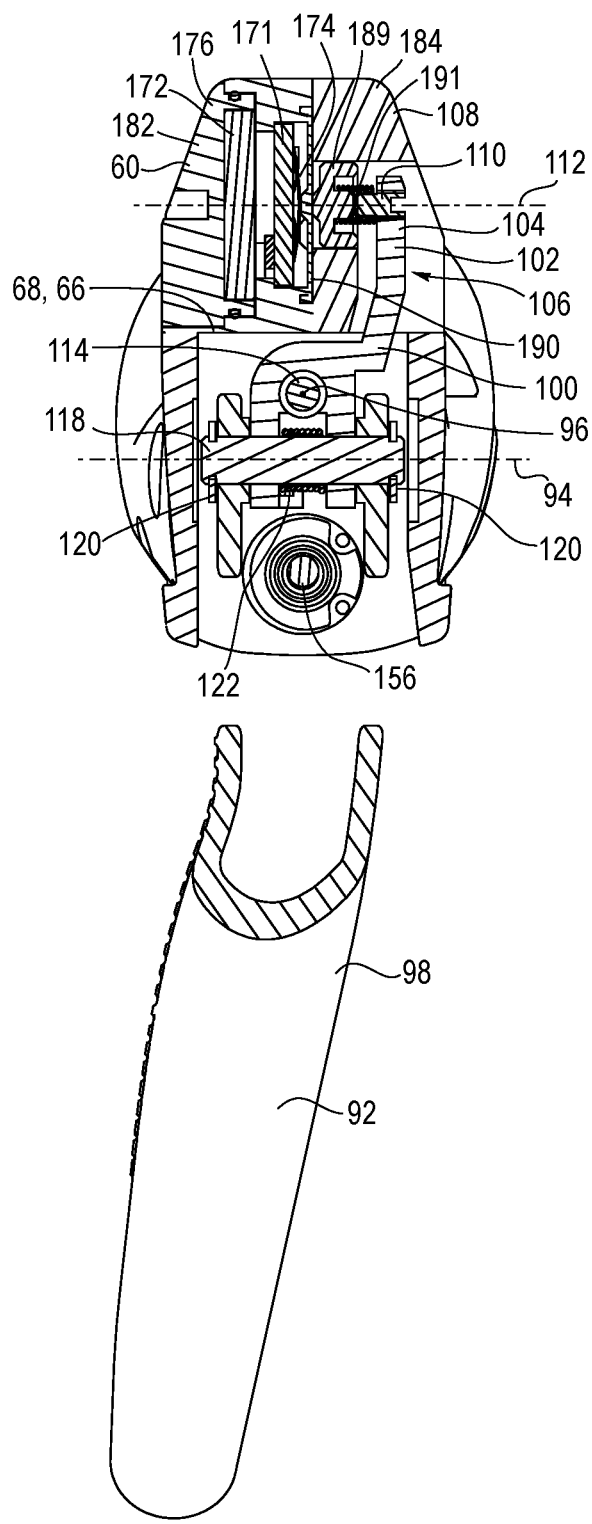
FIG. 9 is a cross-sectional view of the bicycle control system taken along line 9-9 of FIG. 3.
Figure 10:
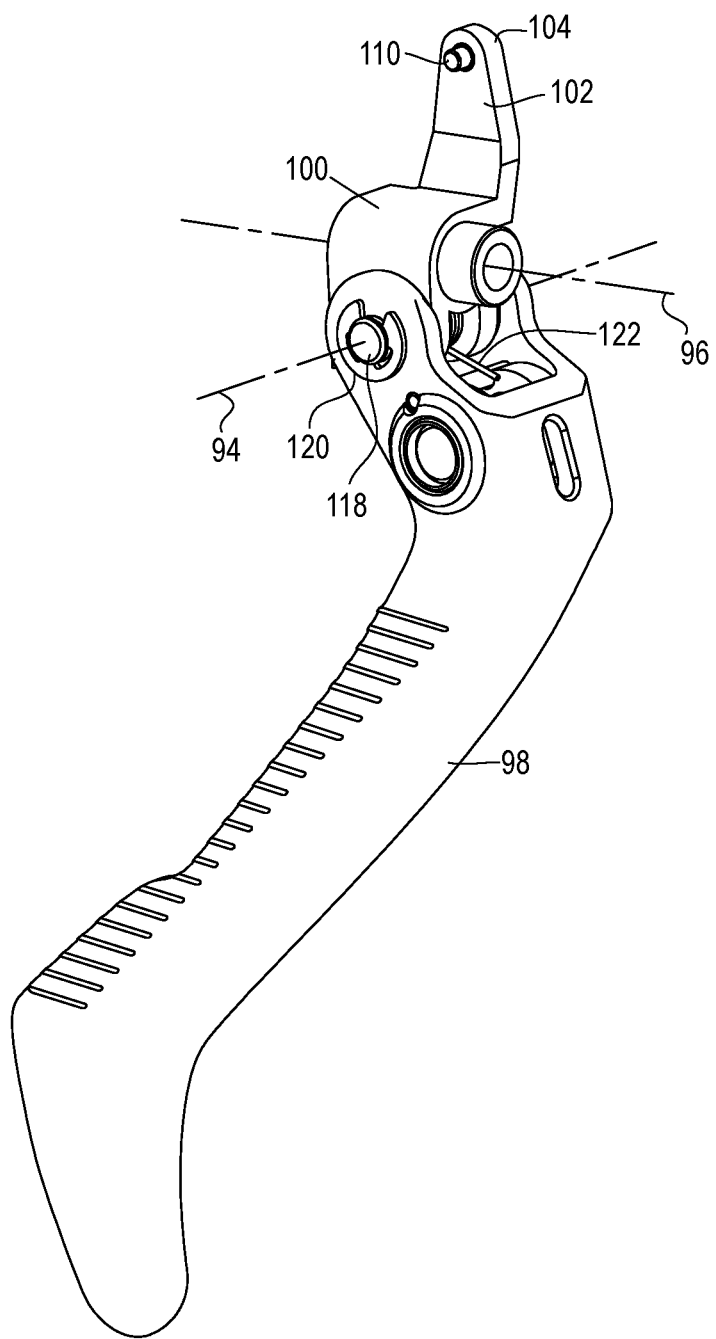
FIG. 10 is a perspective view of one embodiment of a lever assembly.

Referring to FIGS. 4, 9, 22 and 23, when the user moves the shift-brake lever 92 in the shifting direction (i.e. the user's fingers move towards the mid-plane, i.e., centerline 16 of the bicycle), the shift-brake lever 92 along with the brake axle 118 and pivoting portion 100 rotate together around the shift axis 96 (counterclockwise in FIG. 9). The inboard switch actuator 110 compresses the switch spring 191 and contacts the outboard switch actuator 189, which in turn deflects the flexible membrane 190 and actuates the switch 174, for example configured as a dome switch. The closure of the switch 174 is sensed by the CPU, which then sends a wireless shift signal to a gear shifters or derailleurs via a radio and antenna.

When the shift-brake lever moves in the shifting direction, the cross dowel 158 remains stationary relative to the hood and hydraulics, since the cross dowel is axially slidable in the bushings in the shift-brake lever as shown in FIG. 12. In other words, when shifting, there is a relative movement between the cross dowel 158 and the shift-brake lever 92 in the shifting direction. Alternatively, if there is simply enough clearance ("play") between parts, the cross dowel 158 and pushrod 152 may simply rotate slightly about the ball-shaped end 154 of the pushrod when the shift-brake lever is moved in the shifting direction.

When the user releases the shift-brake lever, the shift-brake lever 92 along with the brake axle 118 and pivoting portion 100 rotate together around the shift axis 96 (clockwise in FIG. 9) under the biasing forces of the shift return spring 124 and switch spring 191 until the pivoting portion 100 comes to rest against a home position defined by a surface on the hood base.

It should be noted that it is also possible to brake and shift at the same time. While braking, the user may move the shift-brake lever 92 in the shift direction to perform a shifting operation. Likewise, while shifting, the user may move the shift-brake lever in the braking direction to perform a braking operation. As shown in FIGS. 22 and 23, the shift and brake axes are oriented to discourage inadvertent shifting while braking.

It should also be noted that the shift-brake device can be used for other electronic functions besides sending a wireless shift signal. For example, an inboard press of the shift-brake lever could be used to lock out a suspension fork, or actuate a wireless dropper seat post, or perform any other operation.

It should further be noted that pressing both the left-side and right-side shift-brake levers inboard simultaneously can perform another function, such as activating a wireless dropper post or shifting a front derailleur, etc.

Another feature of the system is called "reach adjust". If the user desires to move the rest position of the shift-brake lever farther from or closer to the handlebar, he/she uses a tool, e.g., a hex wrench to rotate the pushrod 152 about its axis. In doing so, the threads of the pushrod move relative to the threads in the cross dowel 158. This changes the rest position of the shift-brake lever.

Another feature of the system is that the stroke of the shift-brake lever in the shift direction may be adjusted by the user. Referring to FIG. 9, the outer switch actuator 110, also referred to as a poker, may be rotated in threadable engagement with the pivoting portion 100. By using a tool, e.g., a hex wrench, the user may adjust the position of the outer switch actuator 110 relative to the pivoting portion, thus adjusting the distance that the shift-brake lever must move to actuate the switch 174.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations and/or acts are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that any described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

Although embodiments have been described for illustrative purposes, those skilled in the art will appreciate that various modifications, additions, and substitutions are possible, without departing from the scope and spirit of the disclosure. It is therefore intended that the foregoing description be regarded as illustrative rather than limiting, and that it be understood that all equivalents and/or combinations of embodiments and examples are intended to be included in this description.

Although certain parts, components, features, and methods of operation and use have been described herein in accordance with the teachings of the present disclosure, the scope of coverage of this patent is not limited thereto. On the contrary, this patent covers all embodiments of the teachings of the disclosure that fairly fall within the scope of permissible equivalents.

What is claimed is:

1. A bicycle control system comprising:
   a hood base comprising an upper mounting surface, wherein the hood base houses a brake actuation system, and wherein the upper mounting surface is positioned above the brake actuation system;
   a lever pivotally coupled to the hood base about an axis, wherein the lever is operably coupled to the brake actuation system; and
   an electronic module comprising a housing releasably coupled to the upper mounting surface, wherein the housing sealingly encloses at least one electronic component.

2. The bicycle control system of claim 1 wherein the brake actuation system comprises a hydraulic brake actuation system comprising a master cylinder.

3. The bicycle control system of claim 2 wherein the hood base comprises a fluid reservoir disposed above the master cylinder.

4. The bicycle control system of claim 3 wherein the hood base comprises a removable cover disposed over the reservoir, wherein the cover defines in part an upper surface of the hood base.

5. The bicycle control system of claim 1 wherein the axis comprises a brake axis, and wherein the lever is further pivotally coupled to the hood base about a shift axis, wherein the shift axis and brake axis are non-parallel.

6. The bicycle control system of claim 5 comprising a pivoting portion pivotable with the lever about the shift axis, wherein the pivoting portion comprises an arm portion extending above the upper mounting surface, wherein the arm portion comprises an end portion disposed in a recess defined by the housing.

7. The bicycle control system of claim 6 wherein the pivoting portion is coupled to the lever with an axle defining the brake axis.

8. The bicycle control system of claim 6 wherein the electronic component comprises a switch, and wherein the electronic module comprises a membrane separating the switch and the end portion.

9. The bicycle control system of claim 8 wherein the end portion comprises a shift actuator moveably coupled to the arm portion, wherein the shift actuator is moveable relative to the arm portion toward and away from the membrane, and wherein the shift actuator end portion is pivotable about the shift axis between an at rest position and a shift actuation position, wherein the shift actuator actuates the switch when moved to the shift actuation position.

10. The bicycle control system of claim 8 wherein the electronic component comprises an LED, and wherein the module comprises a light pipe extending between the membrane and an outer surface of the housing.

11. The bicycle control system of claim 8 wherein the module comprises a function actuator extending between the membrane and an outer surface of the housing.

12. The bicycle control system of claim 5 wherein the shift axis and the brake axis are substantially orthogonal.

13. The bicycle control system of claim 5 wherein the shift axis and the brake axis define a forwardly opening acute angle.

14. The bicycle control system of claim 13 wherein the acute angle is defined relative to an inboard side of the hood base.

15. The bicycle control system of claim 13 wherein the acute angle is defined relative to an outboard side of the hood base.

16. The bicycle control system of claim 1 wherein the electronic component is hermetically sealed in the housing.

17. The bicycle control system of claim 1 wherein the electronic component comprises at least one of a processing unit, a wireless radio, an antenna, a power source and a switch.

18. The bicycle control system of claim 17 wherein the electronic component comprises a printed circuit board and a power source.

19. The bicycle control system of claim 18 wherein the housing comprises a cover moveable between a closed position and an open position, wherein the power source comprises a battery, and wherein the battery is removable from the housing when the cover is in the open position.

* * * * *